United States Patent
Witchey

(10) Patent No.: US 10,272,873 B2
(45) Date of Patent: Apr. 30, 2019

(54) LANDING GEAR LEG LOCK

(71) Applicant: Bryan Witchey, Cross Junction, VA (US)

(72) Inventor: Bryan Witchey, Cross Junction, VA (US)

(*) Notice: Subject to any disclaimer, the term of this patent is extended or adjusted under 35 U.S.C. 154(b) by 0 days.

(21) Appl. No.: 15/404,030

(22) Filed: Jan. 11, 2017

(65) Prior Publication Data

US 2018/0194320 A1    Jul. 12, 2018

(51) Int. Cl.
*B60R 25/00* (2013.01)
*B60S 9/04* (2006.01)
*B60S 9/22* (2006.01)

(52) U.S. Cl.
CPC .......... *B60R 25/001* (2013.01); *B60S 9/04* (2013.01); *B60S 9/22* (2013.01)

(58) Field of Classification Search
CPC .. E05B 65/0007; E05B 65/0014; E05B 69/00; E05B 73/00; E05B 73/0029; E05B 73/0041; E05B 73/007; E05B 73/02; B60R 25/00; B60R 25/001
See application file for complete search history.

(56) References Cited

U.S. PATENT DOCUMENTS

| | | | |
|---|---|---|---|
| 5,782,115 A * | 7/1998 | Judy | B60D 1/60 248/552 |
| 5,983,684 A * | 11/1999 | Boisvert | B60R 25/00 70/14 |
| 6,173,590 B1 | 1/2001 | Witchey | |
| 6,405,570 B1 * | 6/2002 | Middleton | B66C 23/80 70/174 |
| 6,434,982 B1 * | 8/2002 | Rowland | B60R 25/001 70/14 |
| 6,519,983 B2 | 2/2003 | Witchey | |
| 6,539,757 B2 | 4/2003 | Witchey | |
| 6,553,797 B2 | 4/2003 | Witchey | |
| 6,598,432 B1 * | 7/2003 | Dwyer | B60D 1/60 280/507 |
| 6,675,614 B2 * | 1/2004 | Lai | E05B 37/025 70/22 |
| 6,698,256 B2 | 3/2004 | Witchey | |
| 6,705,135 B2 | 3/2004 | Witchey | |
| 6,705,137 B2 * | 3/2004 | Saladin | B60R 25/001 70/14 |
| 6,874,338 B1 * | 4/2005 | Hunt | E02F 9/24 70/14 |
| 6,990,838 B2 | 1/2006 | Witchey | |

(Continued)

*Primary Examiner* — Christopher J Boswell
(74) *Attorney, Agent, or Firm* — Griffin and Szipl PC

(57) ABSTRACT

A lock for securing semi-trailers. More specifically, the lock of the invention secures the landing gear assembly of a semi-trailer. The lock is made up of a main body, a detachable locking plate, and a lock mechanism. The main body includes a post located in a crankshaft securing portion of the main body. The crankshaft securing portion includes a plurality of crankshaft guides and opposite facing lips which in combination provide a slot to accommodate the detachable locking plate. The post extends outward from an interior surface of the main body. The detachable locking plate fits over at least a portion of the crankshaft securing portion of the main body. The lock mechanism is in operable communication with the detachable locking plate.

15 Claims, 25 Drawing Sheets

(56) References Cited

U.S. PATENT DOCUMENTS

| | | |
|---|---|---|
| 7,278,663 B2 | 10/2007 | Witchey |
| 7,337,636 B2 * | 3/2008 | Witchey .................. E02F 9/085 70/14 |
| 9,393,936 B1 * | 7/2016 | Grote ........................ B60S 9/08 |
| 2002/0104336 A1 | 8/2002 | Witchey |
| 2002/0104340 A1 | 8/2002 | Witchey |
| 2002/0104342 A1 | 8/2002 | Witchey |
| 2003/0167805 A1 | 9/2003 | Witchey |
| 2003/0167806 A1 | 9/2003 | Witchey |
| 2003/0167807 A1 | 9/2003 | Witchey |
| 2004/0200246 A1 | 10/2004 | Witchey |
| 2005/0099018 A1 | 5/2005 | Witchey |

\* cited by examiner

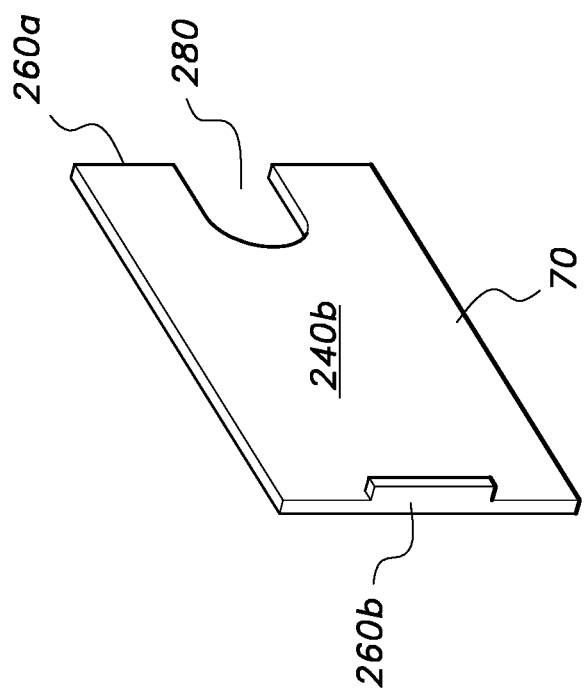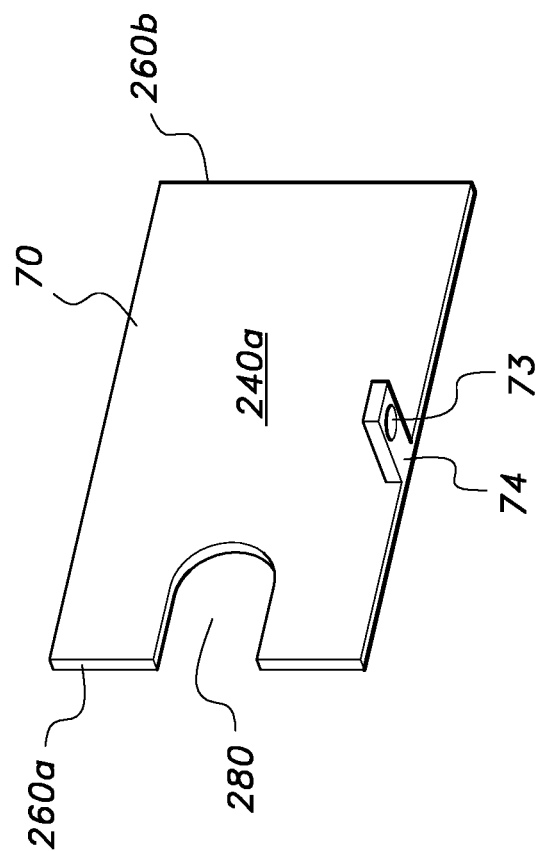
FIG. 3A
FIG. 3B

| Table 1 | |
|---|---|
| 40 | lock 40 |
| 44 | landing gear assembly 44 |
| 46 | crank 46 |
| 48 | crank handle 48 |
| 50 | crankshaft 50 |
| 53 | end 53 of the crankshaft 50 |
| 56a, 56b | two legs 56a, 56b |
| 57 | portion 57 of crankshaft 50 |
| 58 | cross-pin 58 |
| 60 | drive shaft 60 of landing gear assembly 44 |
| 62 | hole 62 for allowing the drive shaft 60 to run therethrough |
| 62b | blind hole 62b |
| 65 | main body 65 |
| 70 | detachable locking plate 70 |
| 72 | slot 72 |
| 73 | tab hole 73 of detachable locking plate 70 |
| 74 | locking tab 74 of detachable locking plate 70 |
| 80 | post 80 |
| 85 | crankshaft securing portion 85 of main body 65 |
| 87 | first end 87 of crankshaft securing portion 85 of main body 65 |
| 105 | longitudinal axis 105 of main body 65 |
| 110 | first sidewall 110 of main body 65 |
| 112 | tongue-hole 112 is located in first sidewall 110 |
| 115 | second sidewall 115 of main body 65 |
| 117a, 117b | opposite facing interior surfaces 117a and 117b of first and second sidewalls 110 and 115 |
| 118a, 118b | first top edge 118a and first bottom edge 118b |
| 119a, 119b | opposite facing first and second lips 119a and 119b |
| 120a, 120b | second top edge 120a and second bottom edge 120b |
| 122 | middle side wall 122 |
| 123a, 123b | first and second ends 123a, 123b of the main body 65 |
| 124 | end plate 124 |
| 125 | first cut-out 125 in end plate 124 |
| 126 | edge 126 of the end plate 124 |
| 127 | an interior surface 127 of the middle side wall 122 |
| 132 | plurality of crankshaft guides 132 |
| 134 | middle guide 134 |

*FIG. 7A*

| Table 1 (continued) | |
|---|---|
| 136a, 136b | first and second outer guides 136a and 136b |
| 138a, 138b | first and second upper guide surfaces 138a and 138b |
| 139a, 139b | Underside surfaces 139a, 139b of the opposite facing lips 119a, 119b |
| 140 | gap 140 |
| 160 | security plate 160 |
| 170 | second end 170 of the crankshaft securing portion 85 |
| 180 | top edge surface 180 of security plate 160 |
| 200a, 200b | first 200a and second 200b opposite surfaces of security plate 160 |
| 220 | an at least one security tab 220 extends from the top edge 180 into the crankshaft securing portion 85 of the main body 65 |
| 240a, 240b | upper and lower surfaces 240a and 240b of detachable locking plate 70 |
| 260a, 260b | first and second opposite ends 260a and 260b of detachable locking plate 70 |
| 270 | overall length 270 of the main body 65 |
| 271 | length 271 of the crankshaft securing portion 85 |
| 272 | length 272 between the second end 170 of the crankshaft securing portion 85 and the second end 123b of the main body 65 |
| 280 | cutout 280 in detachable locking plate 70 |
| 284a, 284b | first and second opposite sides 284a, 284b of detachable locking plate 70 |
| 300 | lock mechanism 300 |
| 305 | lock housing 305 |
| 320b | barrel shaped spring lock 320b |
| 320c | combination lock 320c |
| 325 | key 325 which works with a barrel shaped spring lock 320b |
| 326 | key 326 which works with a combination lock 320c |
| 330 | spring-loaded lock mechanism 330 |
| 368 | padlock 368 |
| 420 | L-shaped bracket 420 |
| 440, 460 | first 440 and second 460 sidewalls of L-shaped bracket 420 |
| 480 | base plate 480 of L-shaped bracket 420 |
| 490 | securing member 490 |
| 495 | securing hole 495 |
| 498 | optional blind hole 498 |
| 500 | locking tongue 500 |

*FIG. 7B*

| Table 1 (continued) ||
|---|---|
| 520 | spring 520 |
| 560 | combination lock hook 560 |
| 570 | combination lock housing 570 |
| 580 | gap 580 is located between the base plate 480 and the second sidewall 460 of bracket 420 |
| 600 | base plate hole 600 of the base plate 480 |
| 620 | end 620 of the lock hook 560 |
| 640 | spring end 640 |
| 660 | spring end 660 |

*FIG. 7C*

LANDING GEAR LEG LOCK

STATEMENT REGARDING FEDERALLY SPONSORED RESEARCH OR DEVELOPMENT

Not Applicable.

FIELD OF THE INVENTION

The present invention relates generally to anti-theft devices. More specifically, the invention is a lock to secure the landing gear assembly of semi-trailers.

BACKGROUND OF THE INVENTION

Semi-trailers are typically detachable from either direct drive tractor units or from other trailers, for example, another trailer in a B-double, B-triple, or semi-trailers in a road train as used in countries such as, but not limited to, Australia.

Preventing thefts of semi-trainers is of economic importance on several grounds. For example, the theft of dropped semi-trailers results in losses to the insurance industry. In addition, businesses are affected by a non-delivery of goods. The distribution of gasoline or diesel is disrupted when semi-trailers carrying gasoline or diesel are stolen. Semi-trailers loaded with expensive goods such as high-end kitchen appliances, if stolen, cause significant business losses. Thus, there is a need for devices to reduce theft of detachable semi-trailers.

SUMMARY OF THE INVENTION

A lock for securing semi-trailers. More specifically, the lock of the invention secures the landing gear assembly of a semi-trailer. The lock is made up of a main body, a detachable locking plate, and a lock mechanism. The main body includes a post located in a crankshaft securing portion of the main body. The post extends outward from an interior surface of the main body. The crankshaft securing portion includes a plurality of crankshaft guides and opposite facing lips which in combination provide a slot to accommodate the detachable locking plate. The detachable locking plate slides between the upper guide surfaces of at least some of the plurality of crankshaft guides and the underside surfaces of the opposite facing lips.

The detachable locking plate fits over at least a portion of the crankshaft securing portion of the main body. The lock mechanism is in operable communication with the detachable locking plate. During normal use of the lock, the post is positioned such that a pivoting part of a crankshaft of a landing gear assembly can be mounted over the post such that the post is located between a pair of legs of the pivoting part of the crankshaft.

BRIEF DESCRIPTION OF THE DRAWINGS

FIGS. 3A and 3B are views of a detachable locking plate according to the present invention.

FIGS. 7A through 7C, show Table 1.

Similar reference characters denote corresponding features consistently throughout the attached drawings.

DETAILED DESCRIPTION OF THE PREFERRED EMBODIMENTS

Figure 1A:
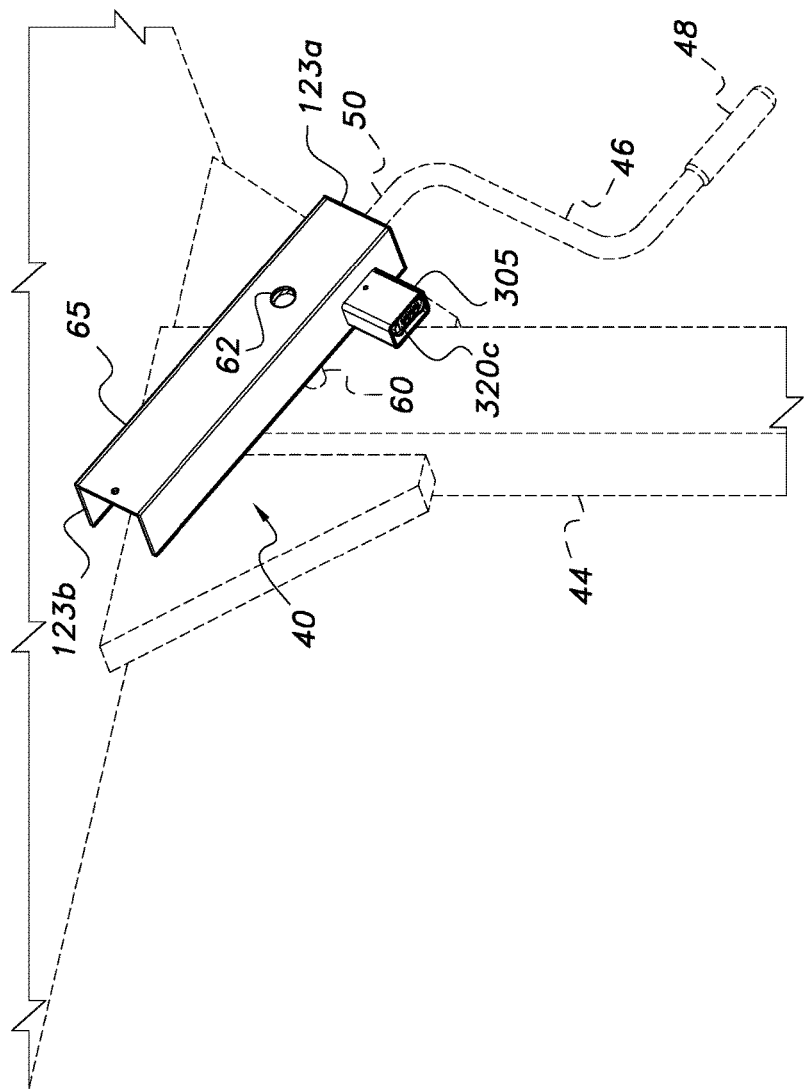
FIG. 1A shows a front environmental view of a lock for securing a landing gear assembly according to the present invention.
Figure 1B:
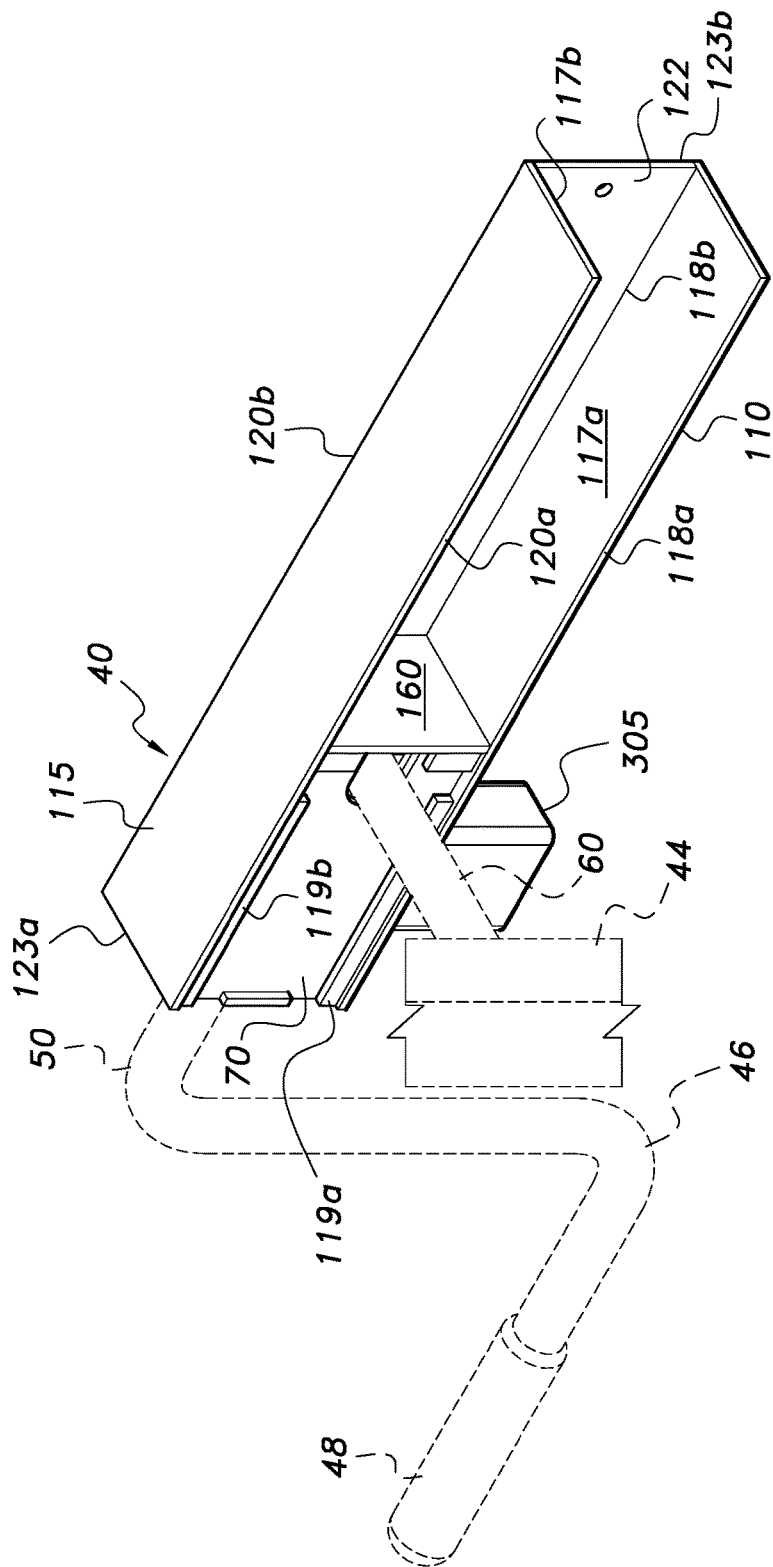
FIG. 1B is a close up rear view of the lock of FIG. 1A showing a detachable locking plate in place over a crankshaft securing portion of a main body.

The present invention is directed to a lock 40. The lock 40 of the invention secures landing gear assemblies of semi-trailers. More particularly, the lock 40 of the invention secures a crank 42 adjoining a landing gear assembly 44.

Table 1 (FIGS. 7A through 7C) is a useful point of reference with respect to the Figures. It should be understood that the terms "elongate" and "elongated" unless otherwise specified refers to the ratio of length verses width where length is relatively greater than width.

Referring to FIG. 1A through FIG. 6, a landing gear assembly 44 of a semi-trailer includes a crank 46, which comprises a crank handle 48 and crankshaft 50. The crankshaft 50 defines legs end 53. Legs end 53 includes two legs 56a, 56b. A cross-pin or bolt 58 interconnects the legs 56a and 56b to a drive shaft 60 of landing gear assembly 44. The crank 46 typically pivots about the cross-pin or bolt 58.

The lock 40 of the invention comprises a main body 65, a detachable locking plate 70, and a lock mechanism 300. The lock mechanism 300 (see FIG. 1) can take any suitable form such as, but not limited to, a barrel shaped spring lock 320b, a combination lock 320c. The lock mechanism 300 (FIG. 1) can be a spring-loaded lock mechanism 330 shown in FIG. 4. The main body 65 defines a longitudinal axis 105.

Figure 4:
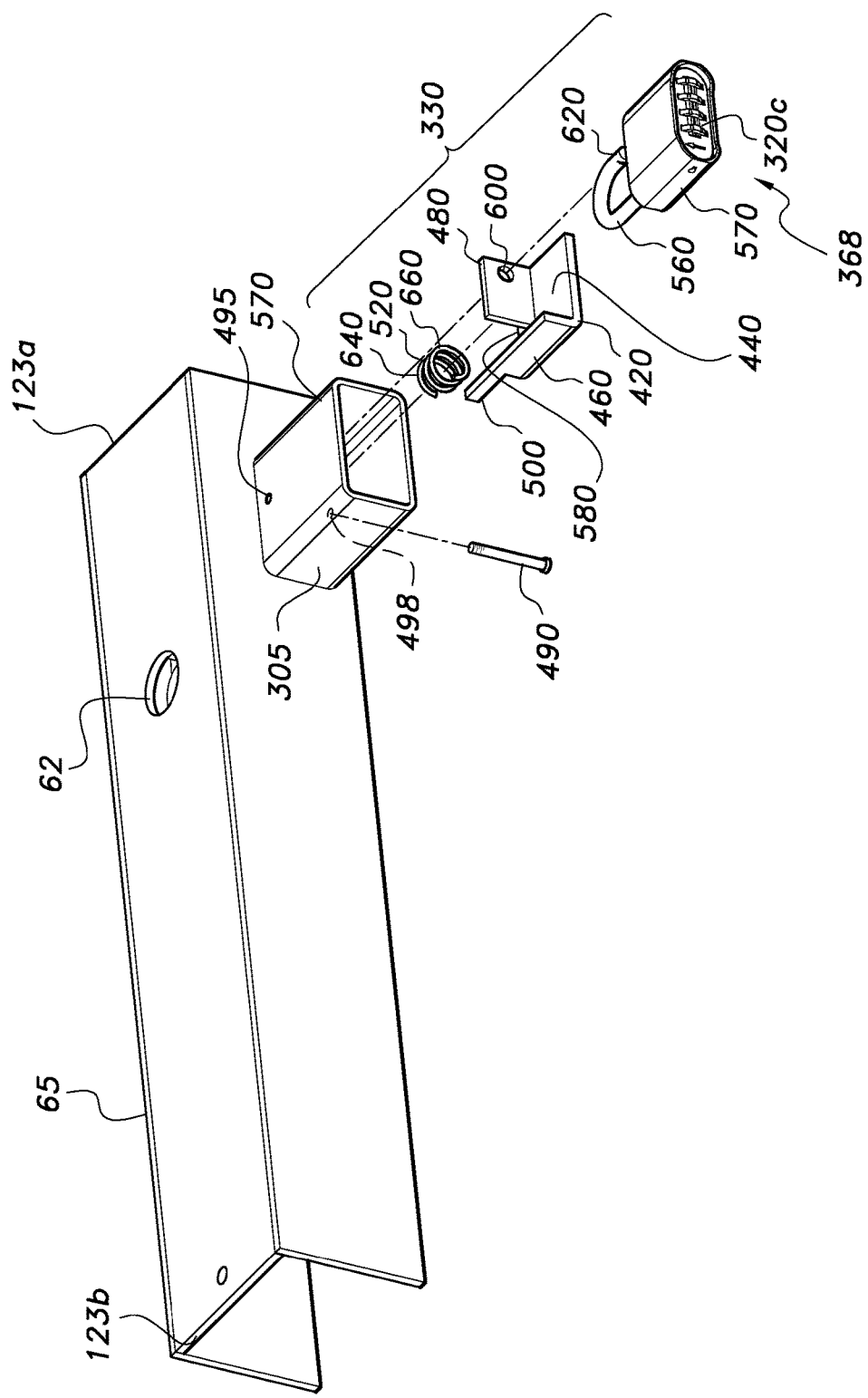
FIG. 4 is an exploded view of the lock of FIG. 1A.

In FIG. 4 the spring-loaded lock mechanism 330 is housed in lock housing 305. The lock housing 305 can be manufactured as an integral part of the main body 65 by for example welding the lock housing 305 to the main body 65.

Alternatively, the lock housing 305 can be attached thereto during manufacture using mechanical fasteners.

The main body includes a post 80 located in a crankshaft securing portion 85 of the main body 65. The post 80 extends from an interior surface 127 of a middle side wall 122 of the main body 65. The detachable locking plate 70 fits into a slot 72 to cover at least a portion of the crankshaft securing portion 85 of the main body 65. The lock mechanism 300 is in operable communication with the detachable locking plate 70.

The post 80 is positioned such that the legs end 53 of a crankshaft 50 is mountable over the post 80 such that the post 80 fits between legs 56a, 56.

The main body 65 includes opposite facing first 110 and second 115 sidewalls. The first sidewall 110 defines first top edge 118a and first bottom edge 118b. The second sidewall 115 defines second top edge 120a and second bottom edge 120b. A middle sidewall 122 is located between the bottom edges 118b and 120b of the first and second sidewalls 110 and 115. The post 80 extends from an interior surface of the main body, and more particularly from an interior surface 127 of the middle sidewall 122. The first and second sidewalls 110 and 115 respectively define opposite facing interior surfaces 117a and 117b.

An optional hole 62 is located in the middle sidewall 122. The optional hole 62 is dimensioned to allow the end of the drive shaft 60 to pass through the optional hole 62 (shown, for example, in FIGS. 1A and 2A). The hole 62 can also take the form of a blind hole 62b located on the interior surface 127 of middle sidewall 122 (see FIGS. 1H and 2H).

The various parts of the lock 40 can be made out of any suitable material such as, but not limited, to a metal alloy such as steel, and coated in any suitable covering such as, but not limited to, paint dip coating, powder coating applied electrostatically and thence subject to heat/oven baking.

For example, the main body 65 can be welded together from parts. Alternatively, the main body 65 can by made, at least in part, by die casting or permanent mould casting. For example, Bateville Products Inc. (St. Lawrenceberg, Ind.) has an aluminum foundry that performs permanent mold casting. The main body 65 can also be made, at least in part, by die casting. It is preferred that the main body 65 is made from steel parts and welded together to ensure strength and quality. Once welded, the main body 65 can be covered in any suitable coating such as, but not limited to, a scratch resistant coating.

The main body 65 has first and second ends 123a, 123b. An end plate 124 having a cut-out 125 therein is located at a first end 87 of crankshaft securing portion 85 of main body 65. In, for example, FIG. 1F the first end 123a of the main body 65 is shown at least partly covered by an end plate 124. However, the first end 87 of the crankshaft securing portion 85 and the first end 123a of the main body 65 may or may not coincide.

The end plate 124 has a cut-out 125 therein. The cut-out 125 is shaped to accommodate the diameter of a crankshaft 50 as shown, for example, in FIGS. 1C and 2C. As can be seen in, for example, FIG. 1D the cut-out 125 extends to an edge 126 of the end plate 124 and is shaped to accommodate the diameter of a crankshaft 50 as shown, for example, in FIG. 1C.

Figure 1C:
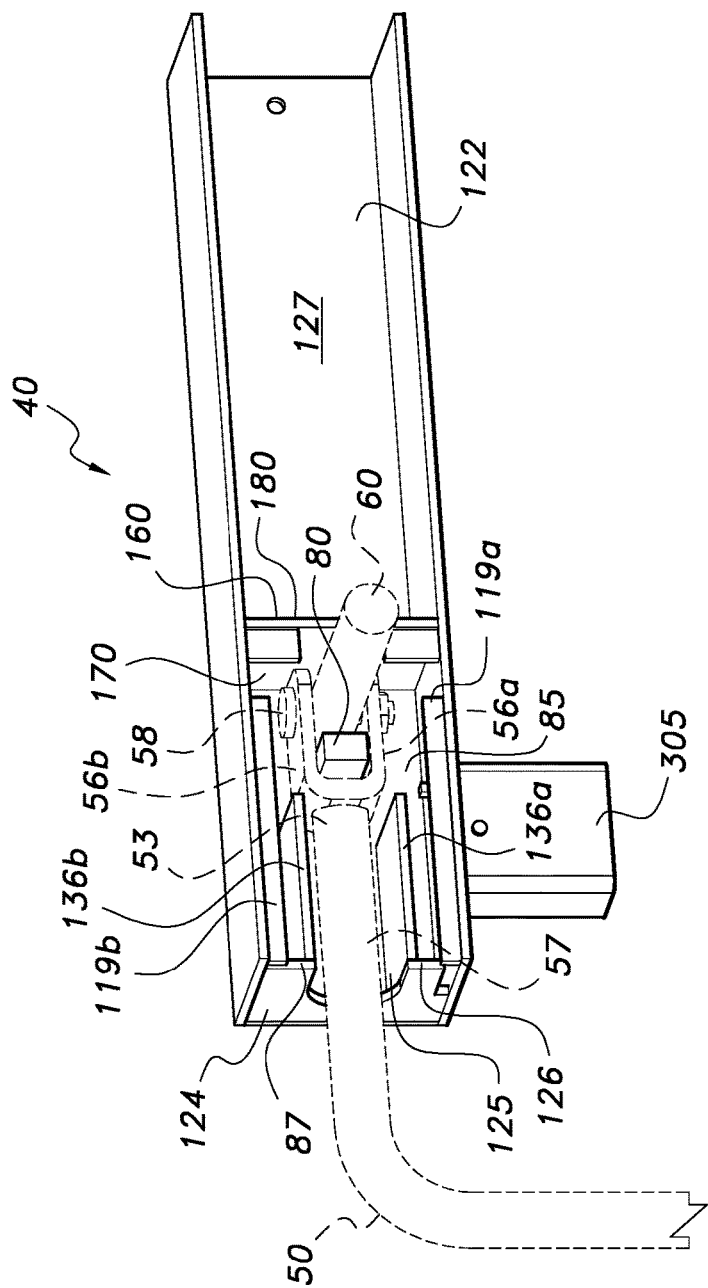
FIG. 1C is a close up rear view of the lock of FIG. 1B showing the detachable locking plate removed thereby displaying the internal features of the crankshaft securing portion of the main body.
Figure 1D:
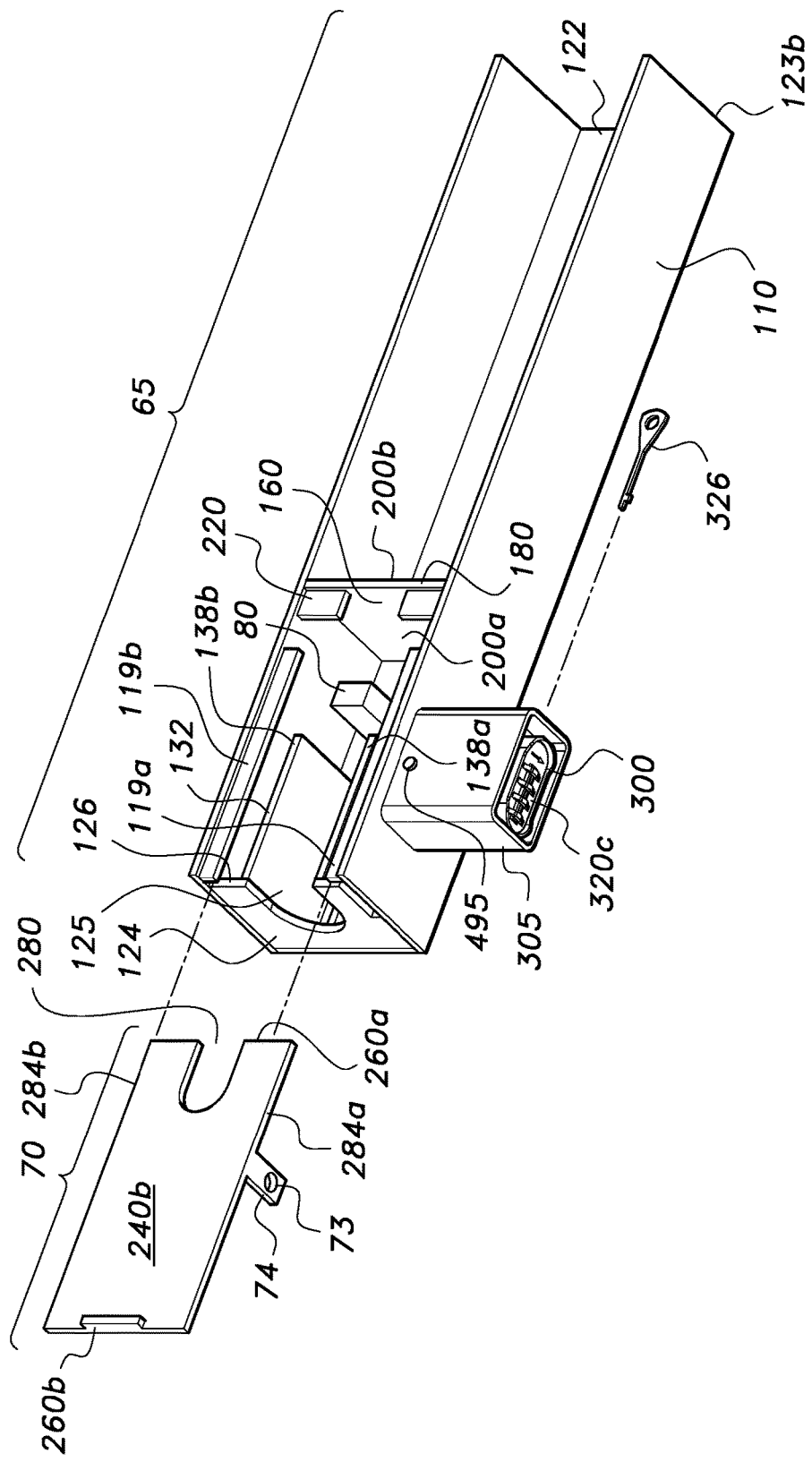
FIGS. 1D through 1F are rear views of the lock of FIG. 1B showing displaying the internal features of the crankshaft securing portion of the main body.
Figure 1E:
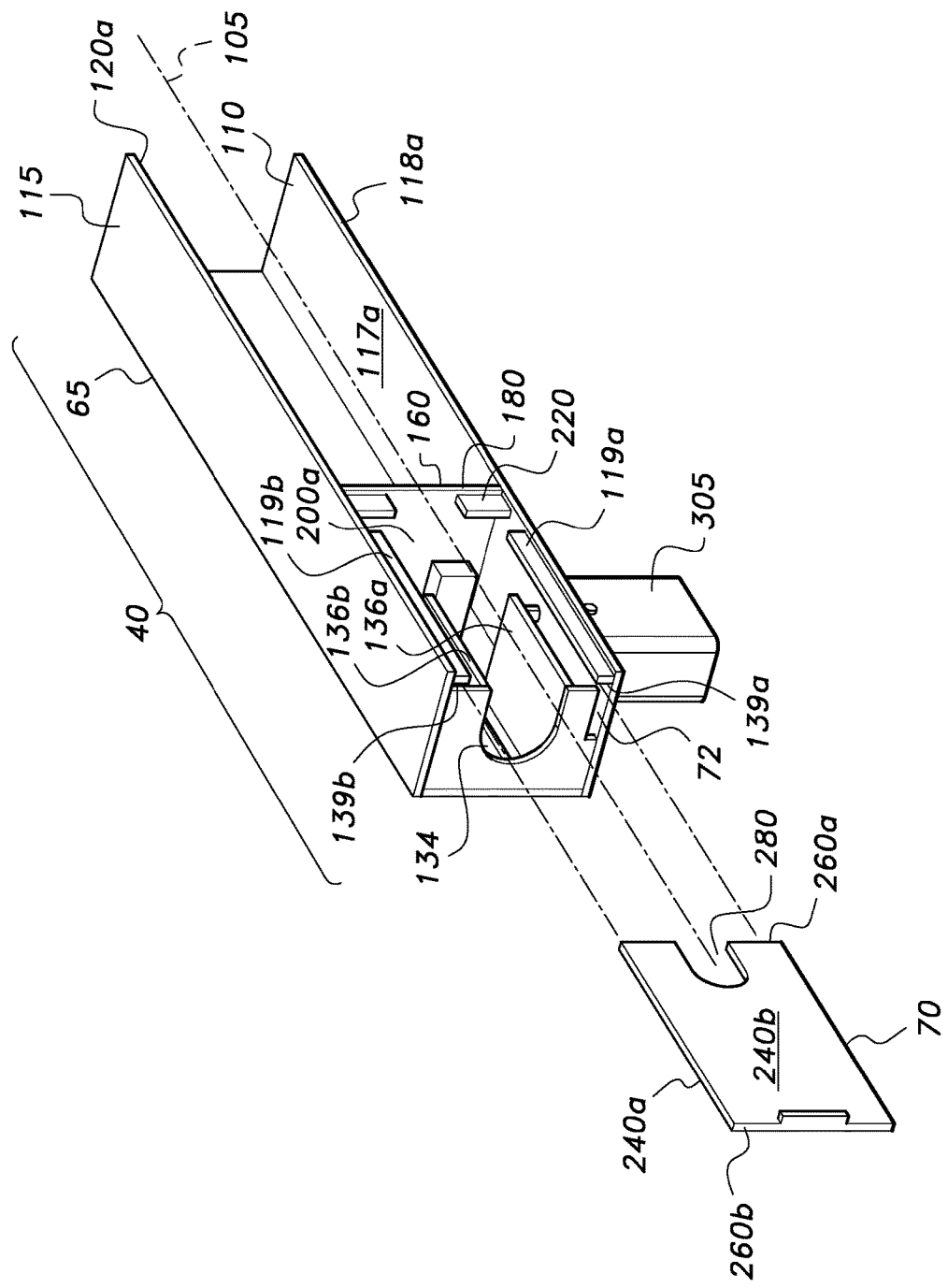
Figure 2A:
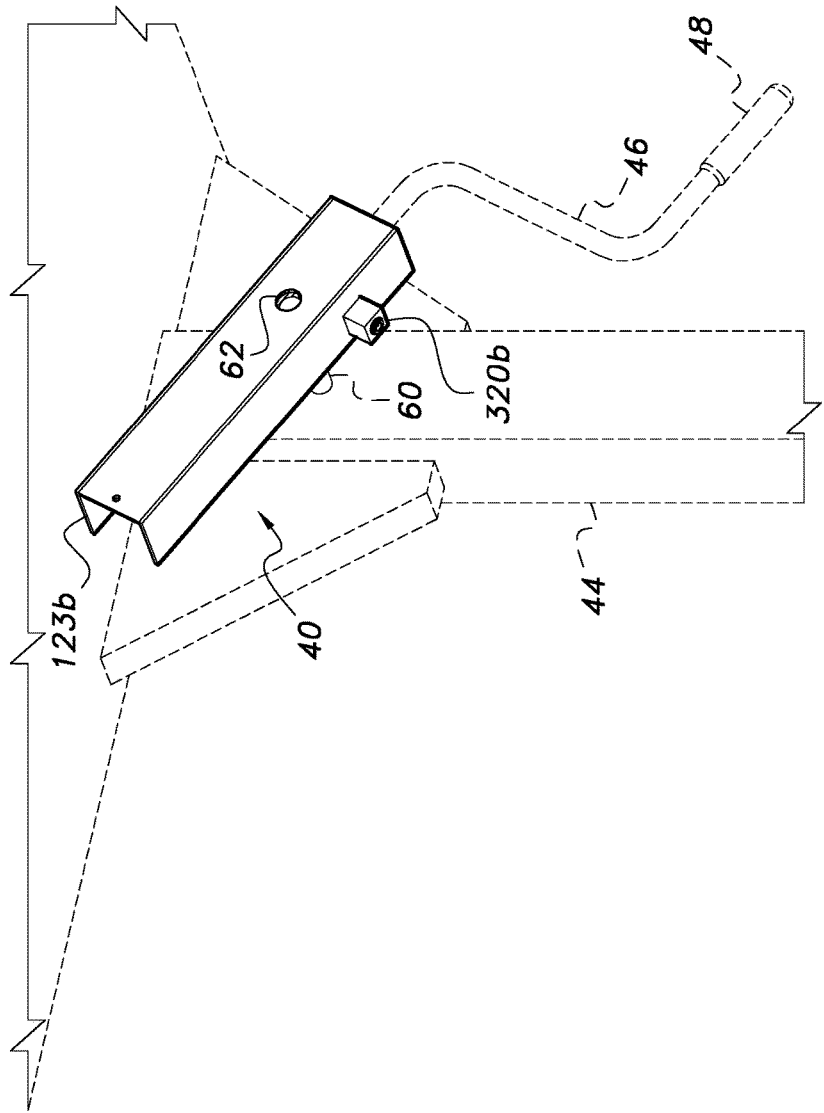
FIG. 2A shows a front environmental view of a lock for securing a landing gear assembly according to the present invention.
Figure 2B:
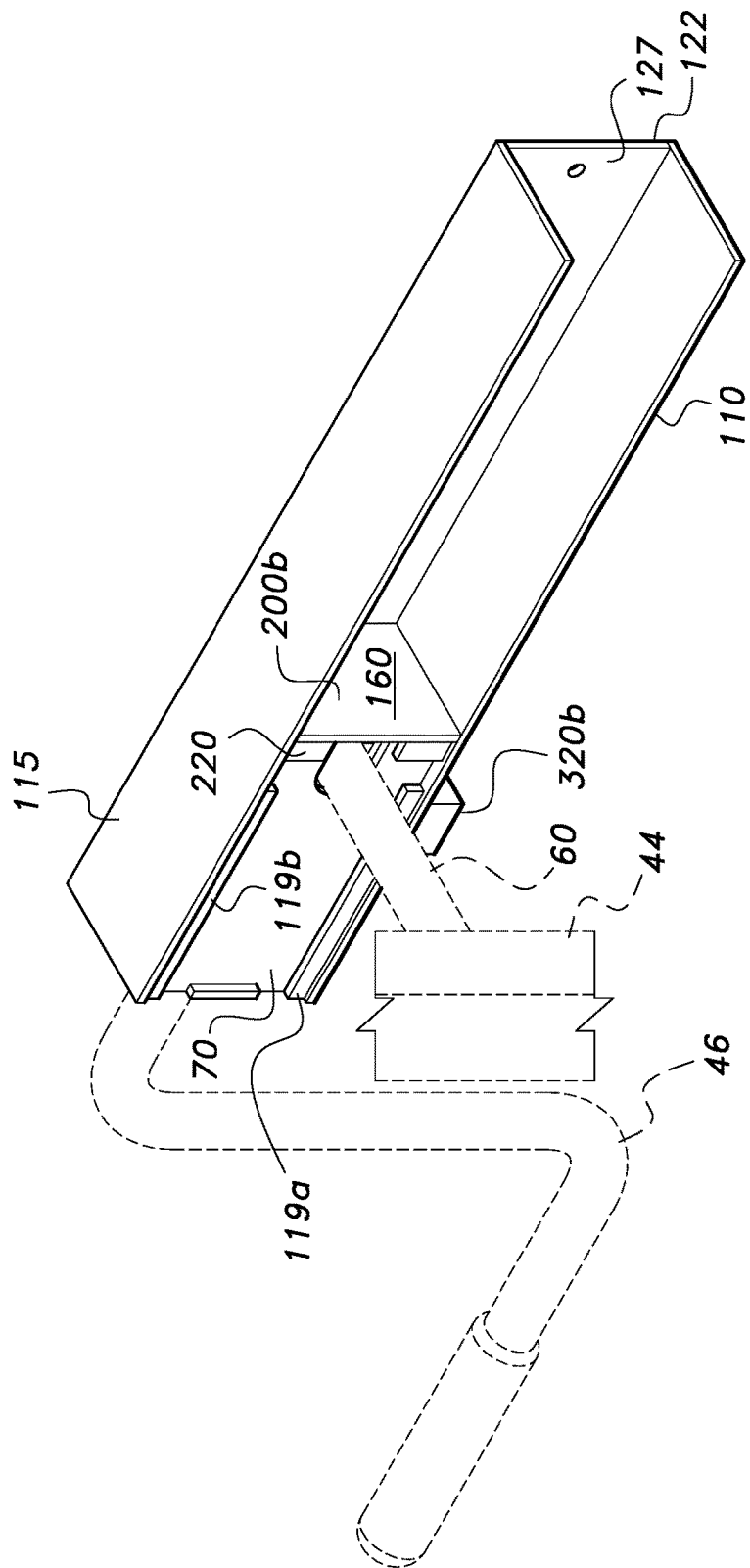
FIG. 2B is a perspective rear view of the lock of FIG. 2A showing a detachable locking plate in place.
Figure 2C:
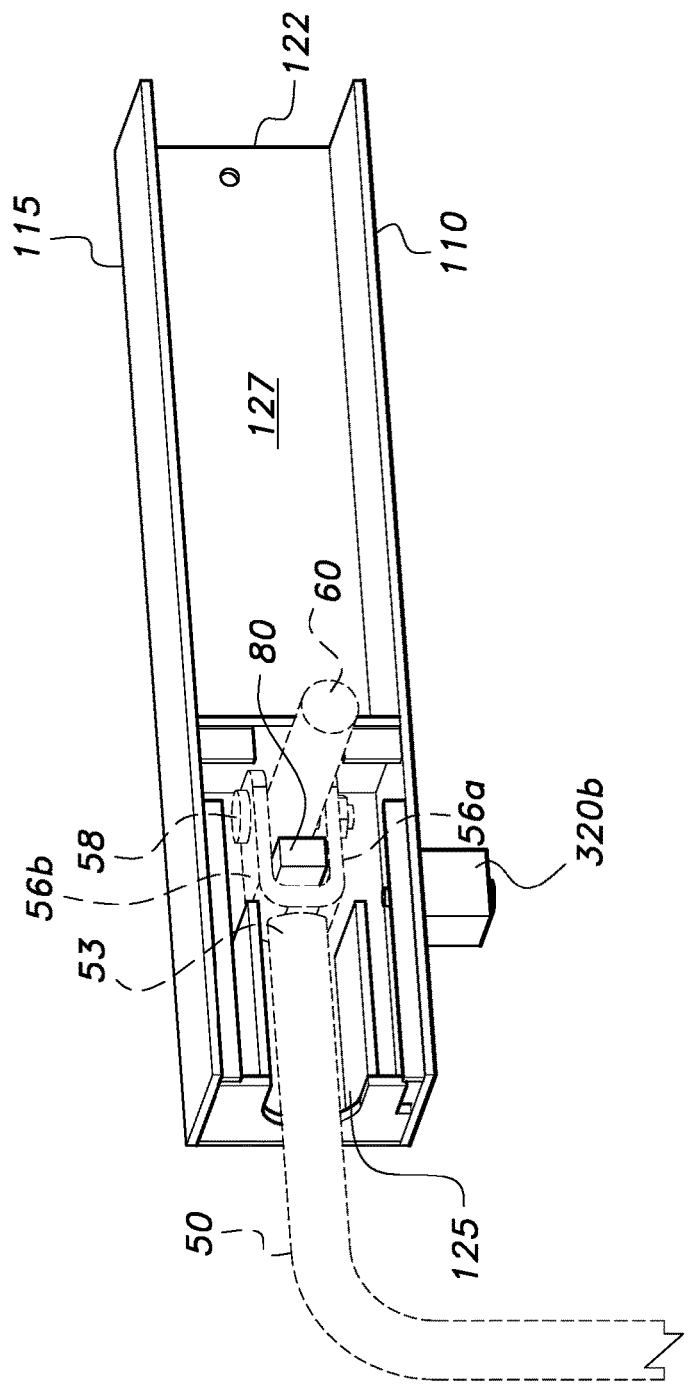
FIG. 2C is a close up rear view of the lock of FIG. 2B showing the detachable locking plate removed thereby displaying the internal features of the crankshaft securing portion of the main body.
Figure 2D:
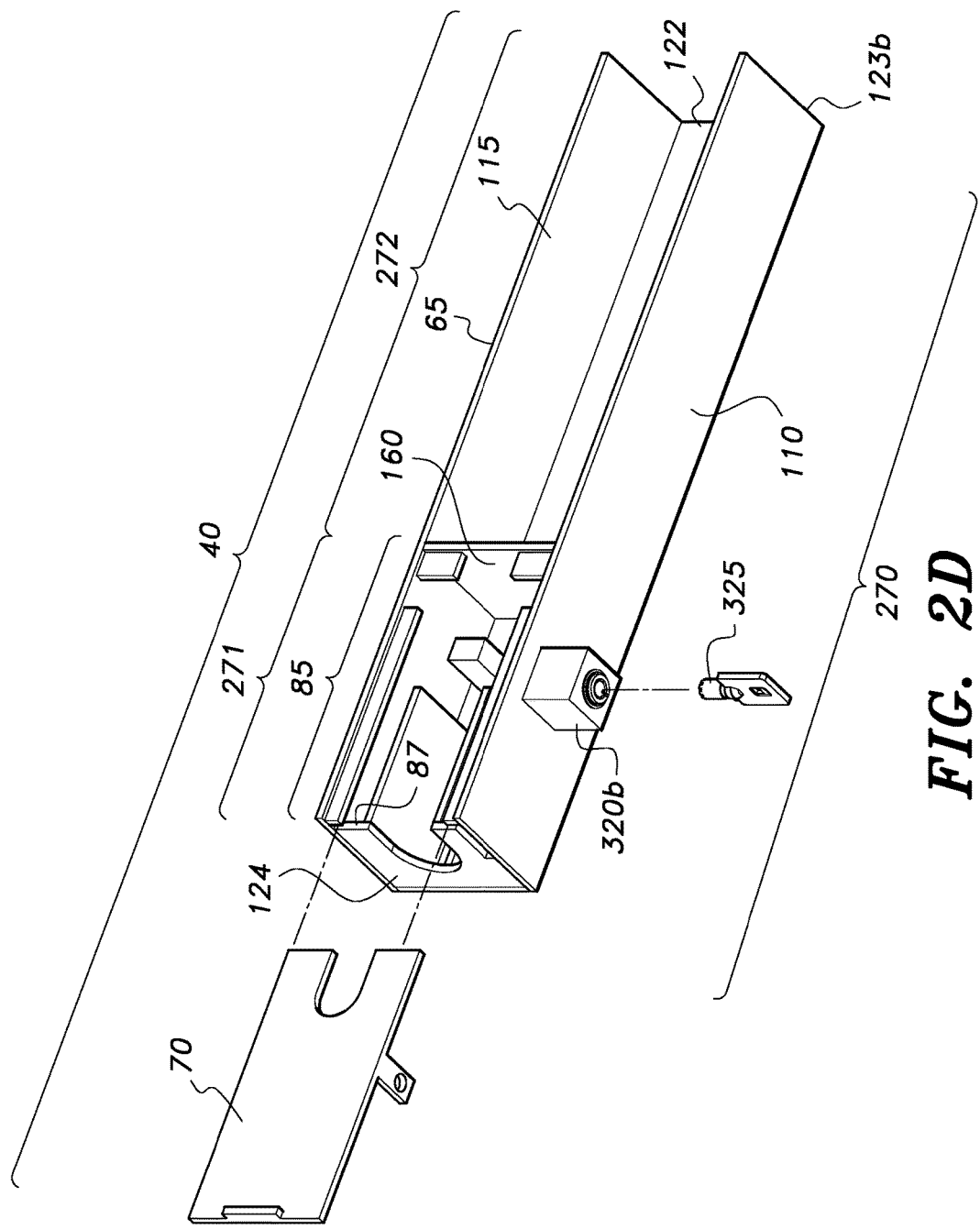
FIGS. 2D through 2F are rear views of the lock of FIG. 2B showing displaying the internal features of the crankshaft securing portion of the main body.
Figure 2E:
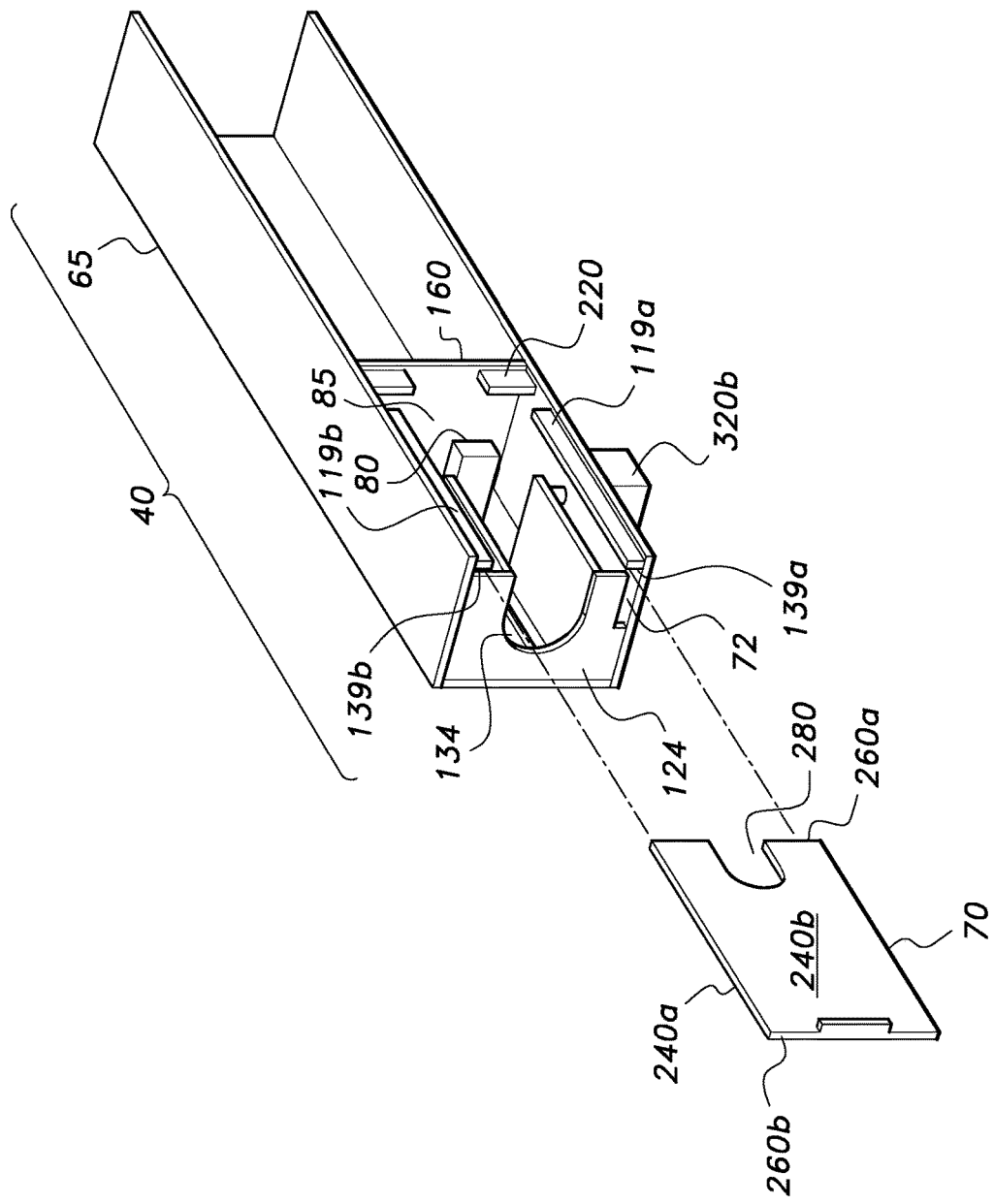
Figure 2F:
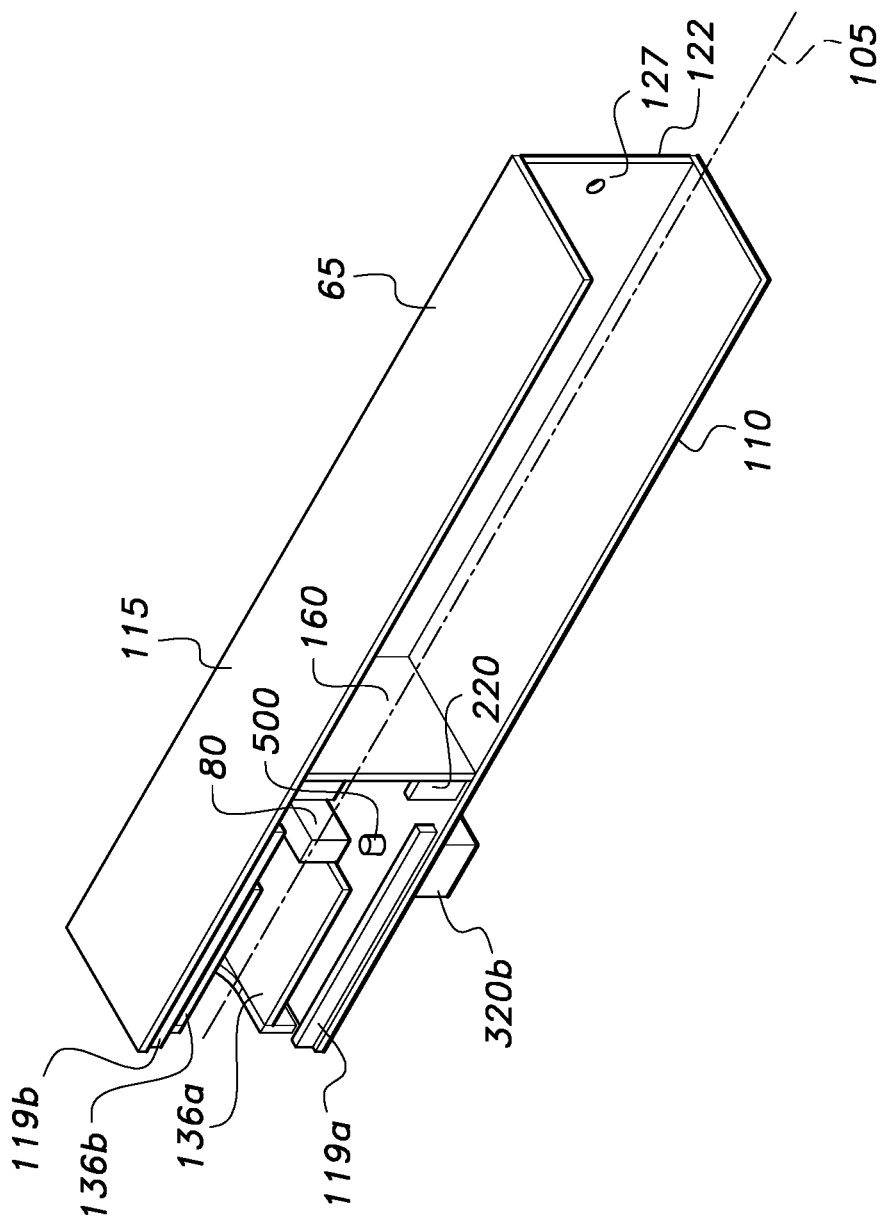

Referring to FIGS. 1E and 2E, opposite facing first and second lips 119a and 119b respectively extend from top edges 118a and 120a into the crankshaft securing portion 85 of the main body 65. The opposite facing lips 119a and 119b include underside surfaces 139a, 139b thereof (see, for example, FIG. 6). During normal operation of lock 40, the detachable locking plate 70 slides between the upper guide surfaces 138a and 138b and the underside surfaces 139a, 139b of the opposite facing lips 119a, 119b.

Figure 2G:
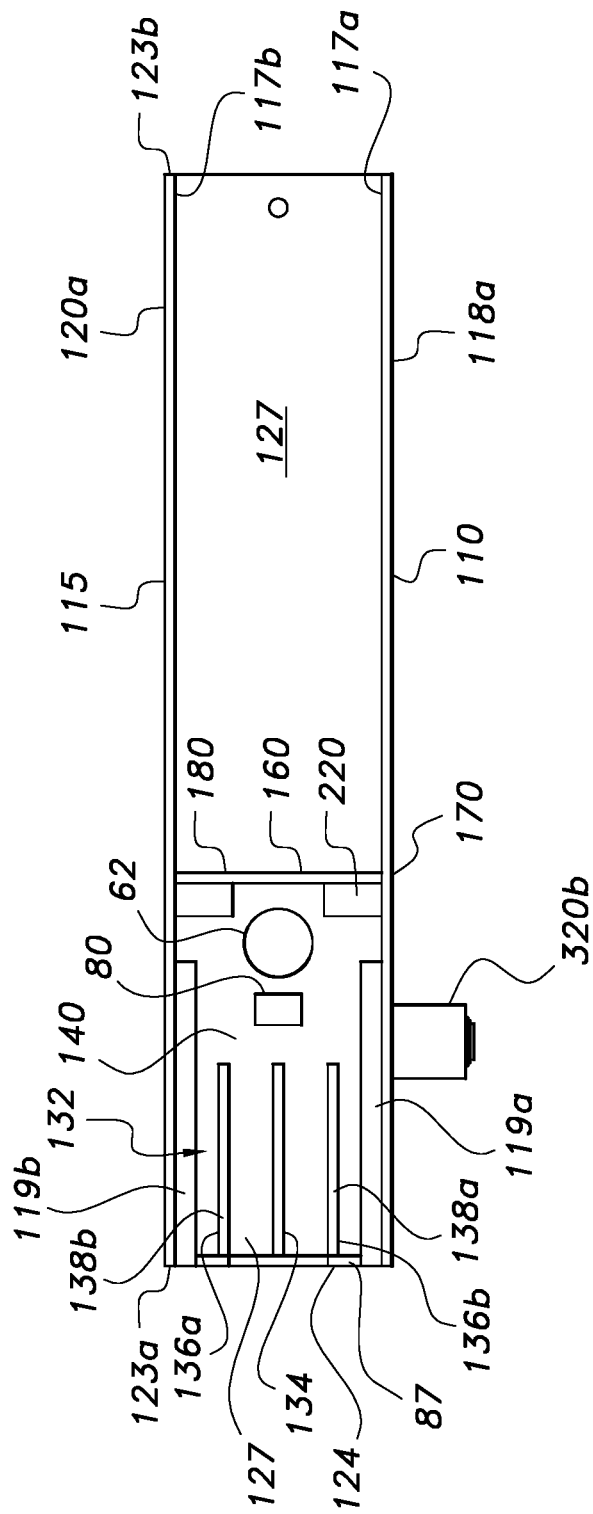
FIG. 2G is a rear top view of the main body of the lock shown in FIG. 2A.
Figure 2H:
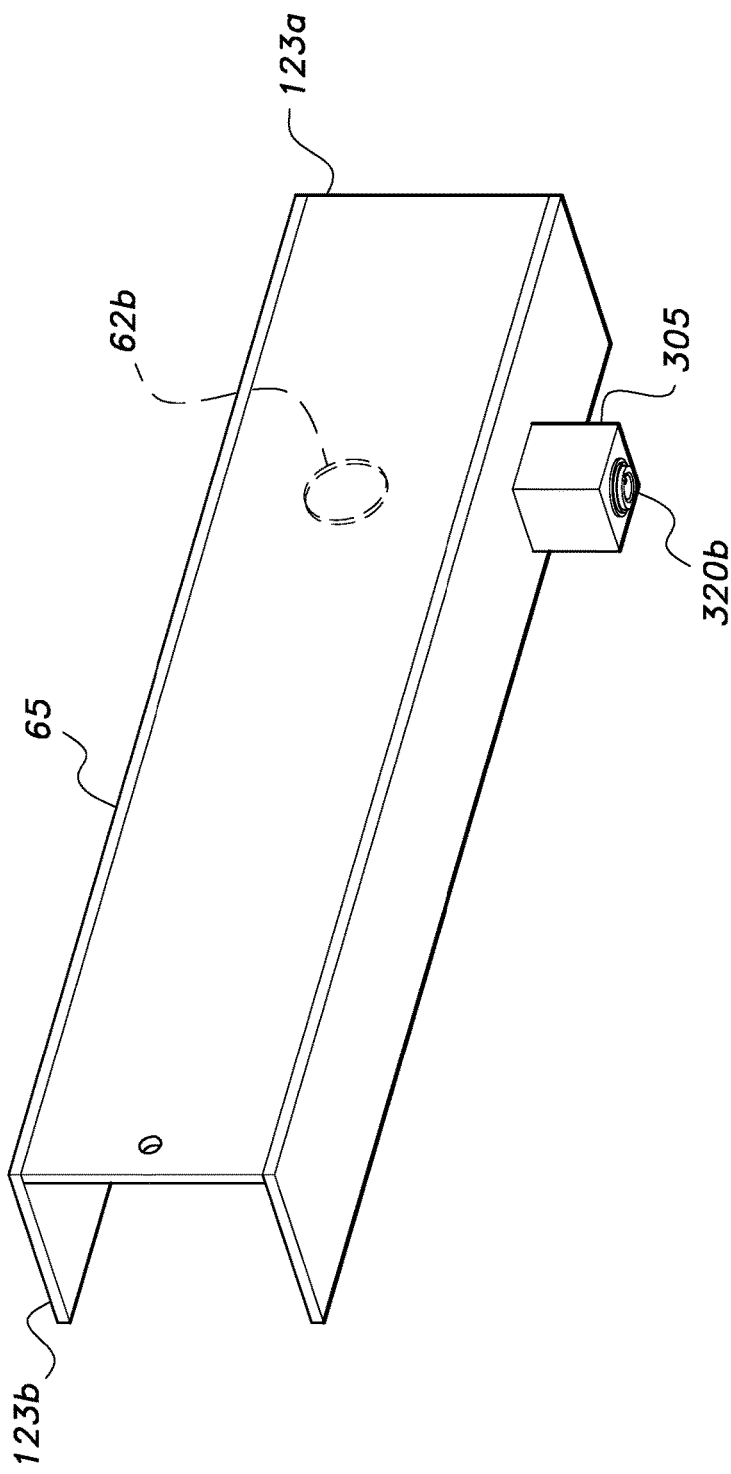
FIG. 2H is a view of the main body further showing a blind hole according to the present invention.

A plurality of crankshaft guides 132 extend from the interior surface 127. The plurality of crankshaft guides 132 are located in crankshaft securing portion 85 of main body 65. Referring to FIG. 2G the plurality of crankshaft guides 132 is made up a middle guide 134 located between a first outer guide 136a and second outer guide 136b. It should be understood that the number and layout of guides 132 can vary.

A portion 57 of the crankshaft 50 fits between the first and second outer guides 136a and 136b. The crankshaft 50 typically rests on the middle guide 134. In FIGS. 1G and 2G the outer guides 136a, 136b, and middle guide 134 are shown parallel to each other, but this is not a requirement. Specifically, the guides can be of any suitable configuration and their number can vary.

Each of the outer guides 136a and 136b respectively define a first upper guide surface 138a and a second upper guide surface 138b. The upper guide surfaces 138a and 138b, and lips 119a and 119b cooperate to provide slot 72 to accommodate the detachable locking plate 70. The portion 57 of crankshaft 50 is covered upon inserting the detachable locking plate 70 into slot 72. The plurality of guides 132 extend at least partway between the first end plate 124 and the post 80. For example, in FIGS. 1G and 2G, a gap 140 is shown between the post 80 and the guides 132.

The crankshaft securing portion 85 is of sufficient dimensions to accommodate the legs end 53 of crankshaft 50 and more particularly is sized to accommodate two legs 56a, 56b mounted around post 80, the end of the drive shaft 60 and the opposite ends of the cross-pin 58 (see FIG. 1C). The crankshaft securing portion 85 is further of sufficient dimensions to accommodate at least a portion 57 of the crankshaft 50 connected to the two legs 56a, 56b.

Figure 1F:
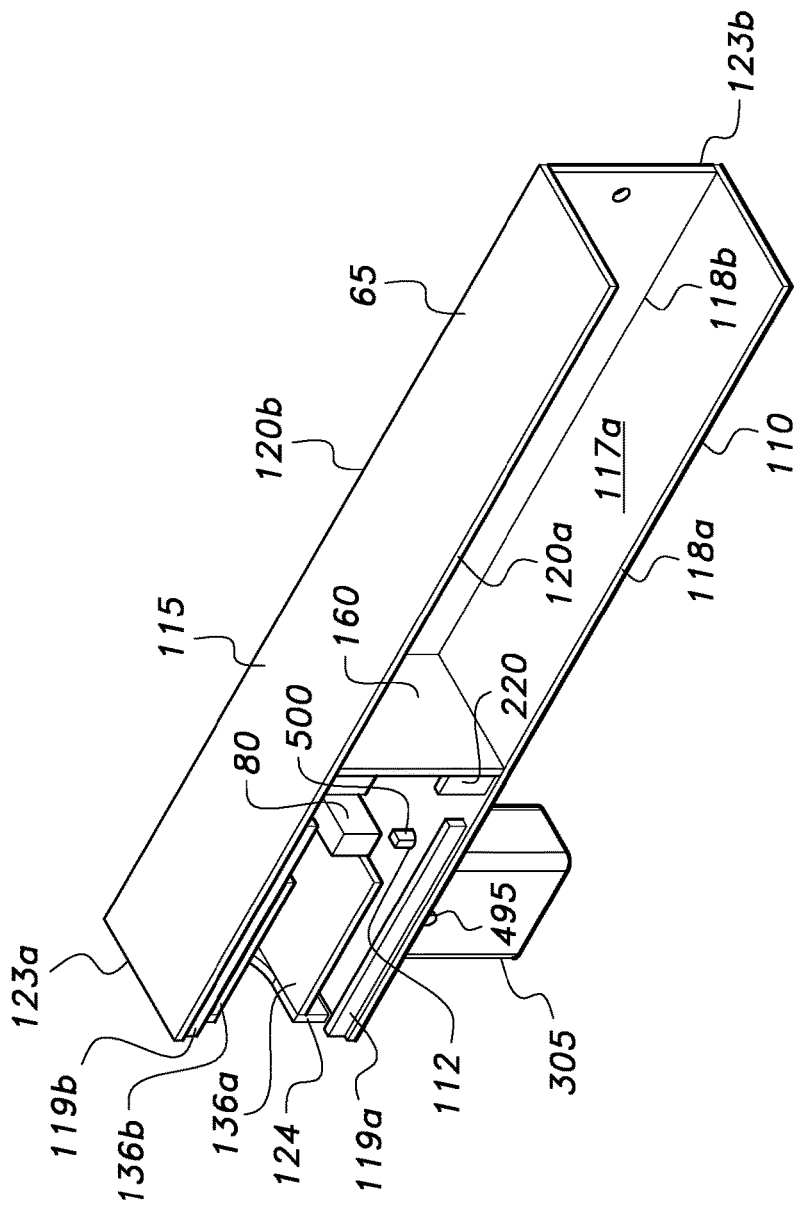
Figure 1G:
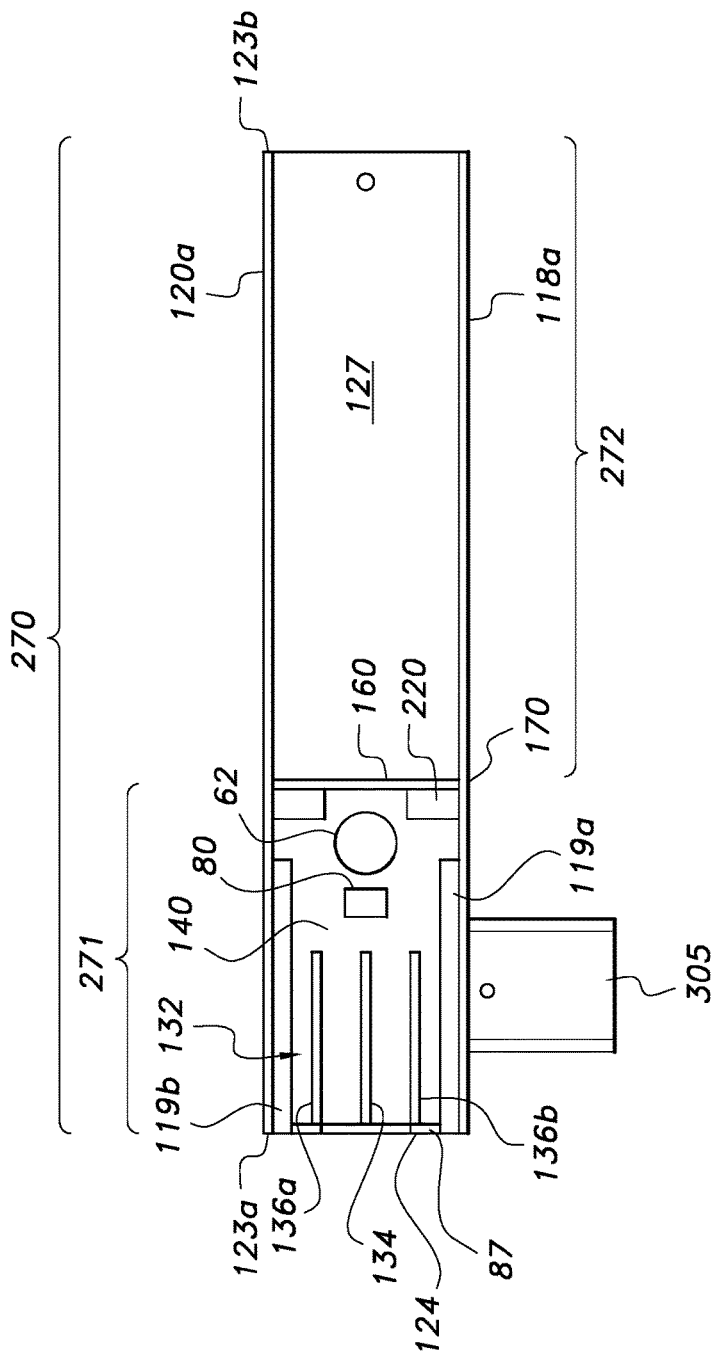
FIG. 1G is a top rear view of the main body of the lock shown in FIG. 1A.
Figure 1H:
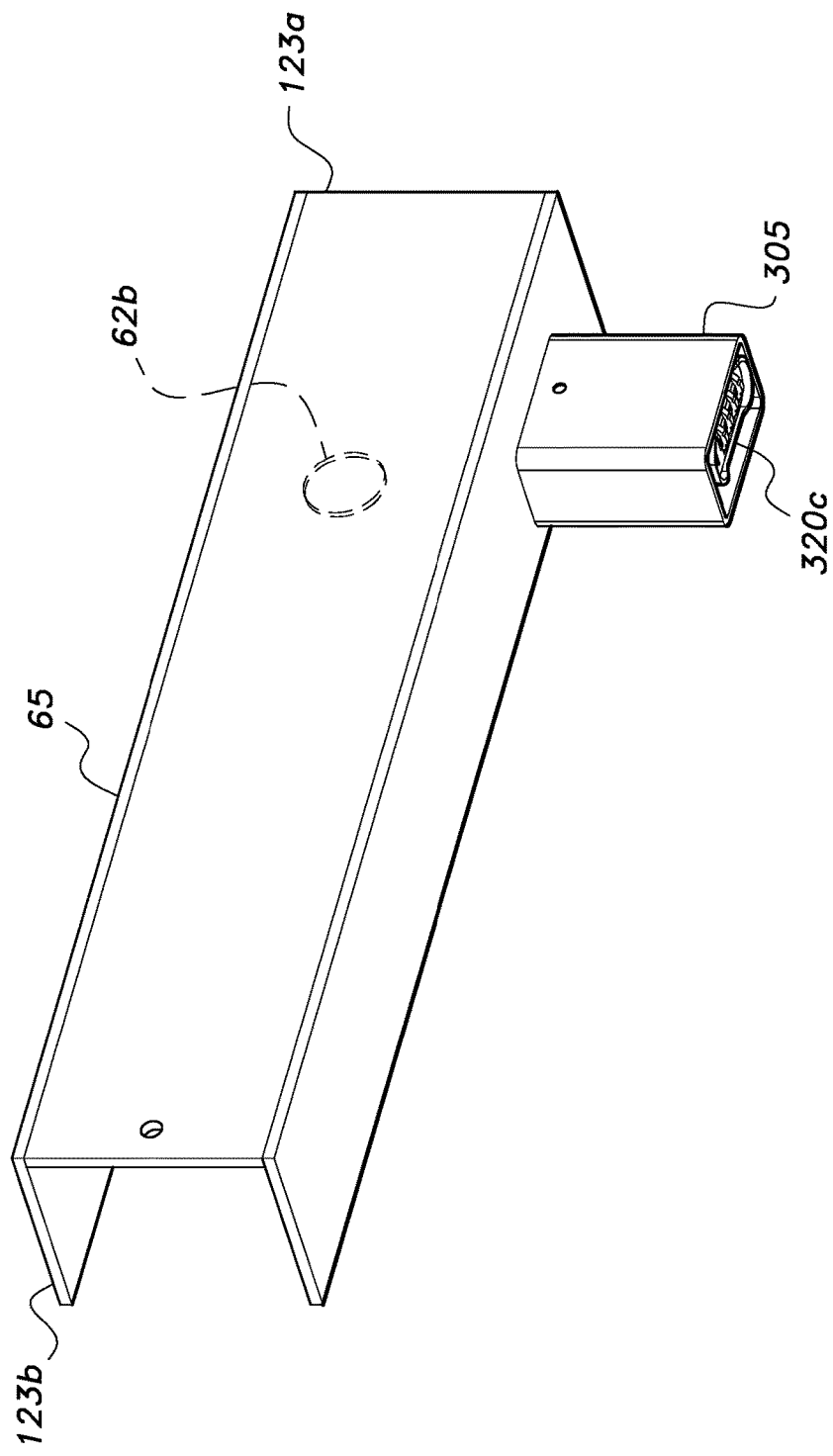
FIG. 1H is a view of the main body further showing a blind hole according to the present invention.
Figure 5:
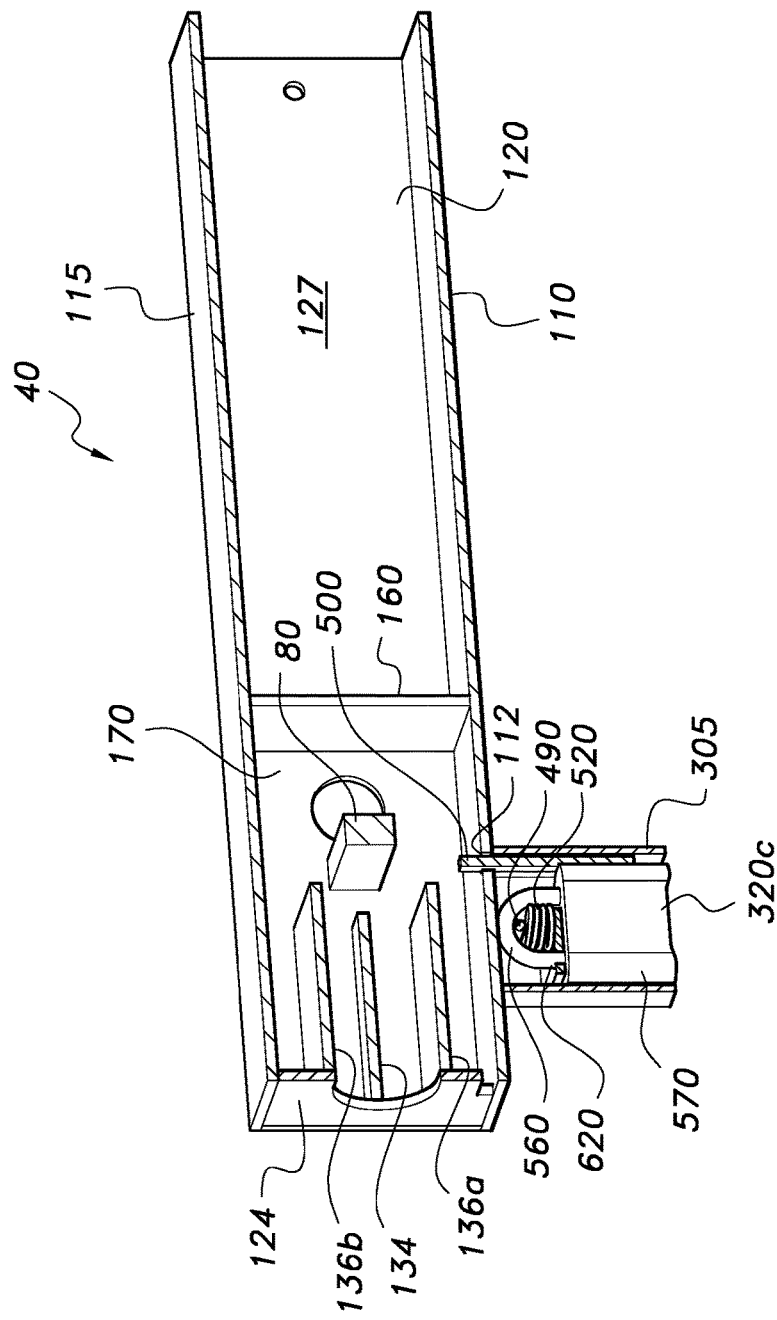
FIG. 5 is a partial cutaway view of the lock of FIG. 1A.
Figure 6:
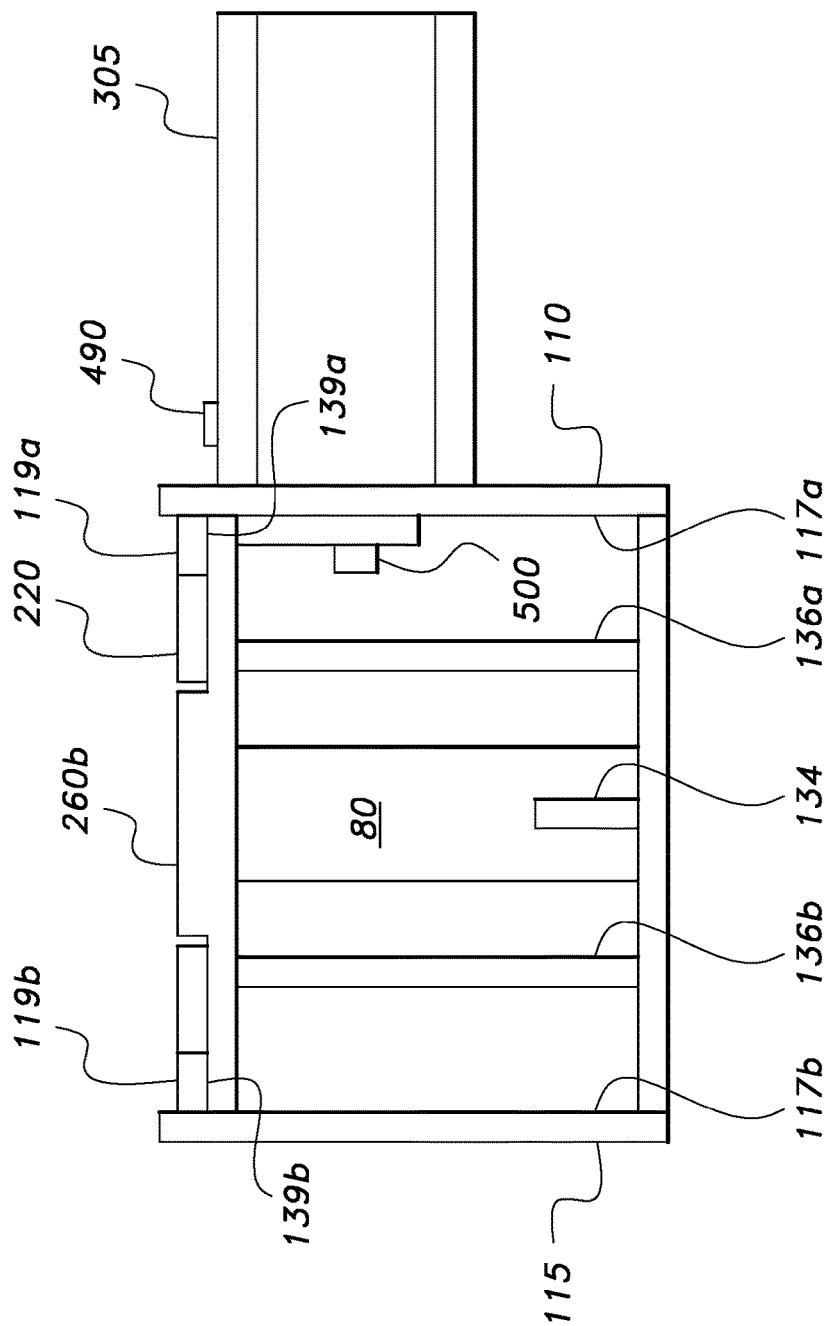
FIG. 6 is an end view of the lock of FIG. 1A.

A tongue-hole 112 is located in first sidewall 110 (see, for example, FIGS. 1F and 5). A tab-hole 73 extends through a locking tab 74 of detachable locking plate 70. The tongue-hole 112 is positioned such that when the detachable locking plate 70 is placed in slot 72, the tab-hole 73 aligns with tongue-hole 112. Once tab-hole 73 is aligned with tongue-hole 112 a tongue 500 is free to pass into and out of holes 112 and 73. When tongue 500 is inserted into tongue-hole 112 the detachable locking plate 70 is secured over the crankshaft securing portion 85 of main body 65 thereby preventing unwanted interference with crank 46 and thereby prevent unwanted interference with the landing gear 44.

It should be understood that the dimensions of the locking tab 74 can vary so long as the locking tab 74 does not interfere with the slotting of the detachable locking plate 74 in slot 72 and so long as the tab-hole 73 aligns with tongue-hole 112.

A security plate 160 is located between the first and second ends 123a, 123b of the main body 65. More specifically, the security plate 160 is located at the second end 170 of crankshaft securing portion 85. In this embodiment the crankshaft securing portion 85 extends between the end plate 124 and the security plate 160. The security plate 160 extends between the first 110 and second 115 sidewalls.

The plates 124, 160 and detachable locking plate 70 work collectively to prevent illicit access to the crankshaft securing portion 85.

Figure 1I:
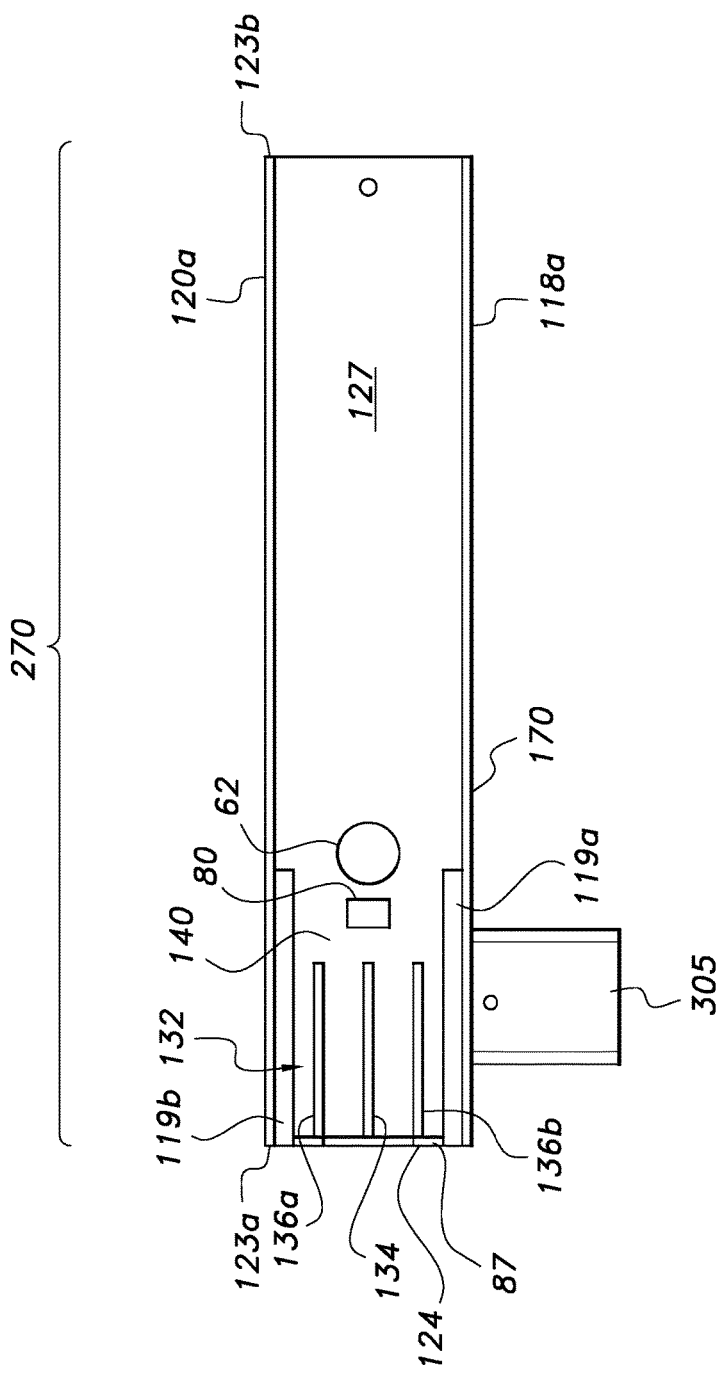
FIG. 1I is a view of the main body with a security plate omitted according to the present invention.
Figure 2I:
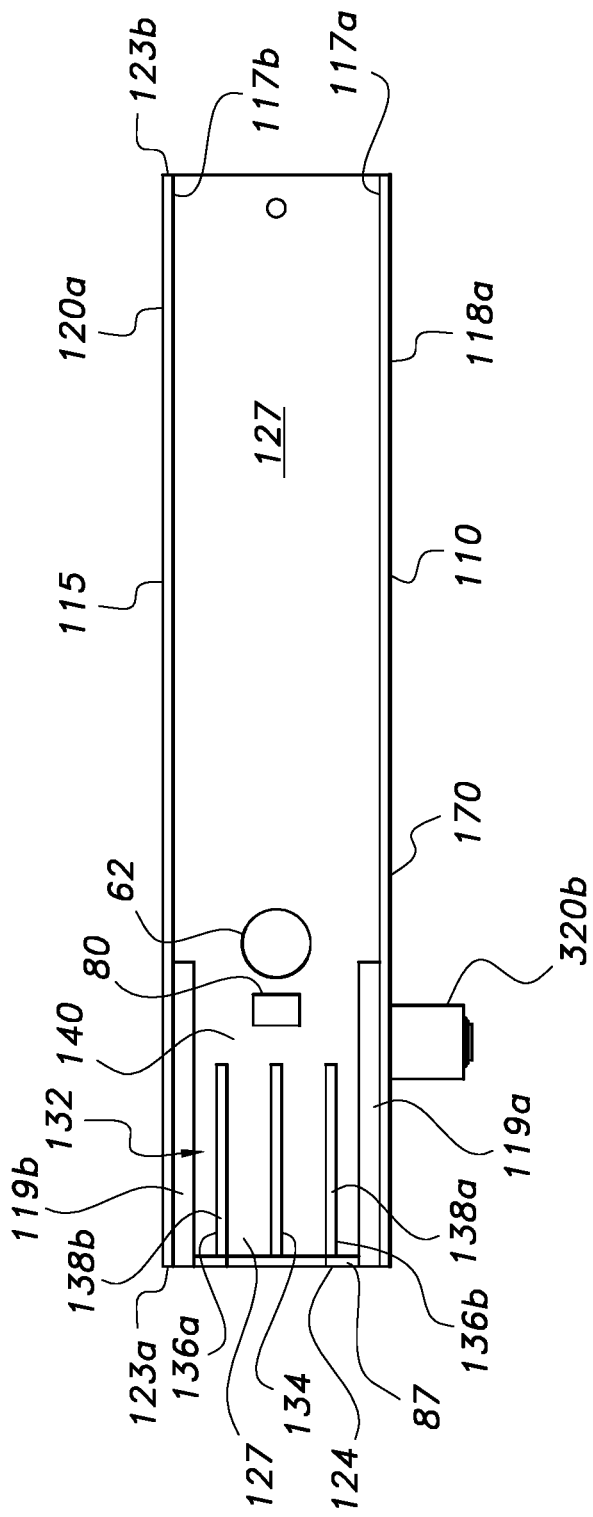
FIG. 2I is a view of the main body with a security plate omitted according to the present invention.

The security plate 160 helps prevent thieves pushing elongated objects into crankshaft securing portion 85 of main body 65 via end 123b. While it is preferred that the security plate 160 forms part of the main body 65, this is optional, i.e., the security plate 160 can be omitted as shown in FIGS. 1I and 2I.

The security plate 160 is located on the opposite side of the post 80 from the end plate 124, i.e., the security plate 160 is located at a position between the post 80 and end 123b of the main body 65. The security plate 160 defines a top edge surface 180, and first 200a and second 200b opposite surfaces. The first surface 200a of the security plate 160 faces the post 80. The crankshaft securing portion 85 extends between the end plate 124 and the security plate 160. While it is preferred that the security plate 160 forms part of the main body 65, the security plate 160 can be omitted.

An at least one security tab 220 extends from the top edge 180 into the crankshaft securing portion 85 of the main body 65. The lips 119a and 119b, top edges 118a and 120a, and the at least one security tab 220 serve to provide slot 72 for securing the detachable locking plate 70 to the main body 65, and more particularly to cover at least a portion of the crankshaft securing portion 85 of the main body 65.

Referring to FIGS. 3A and 3B, the detachable locking plate 70 is substantially planar with upper and lower surfaces 240a, and 240b; first and second opposite ends 260a and 260b; and a locking plate cutout 280 which extends partway from end 260a in the direction of end 260b. A locking tab 73 extends from first opposite side 284a of the detachable locking plate 70 into the crankshaft securing portion 85 of main body 65. The locking tab 73 includes a tab-hole 74. The tab-hole 74 extends through the locking tab 73.

It should be understood that the position and dimensions of the locking tab 73 can vary so long as the locking tab 73 does not interfere with the slotting of the detachable locking plate 70 in slot 72 and so long as the tab-hole 74 aligns with tongue-hole 112.

The main body 65 defines an overall length 270. The crankshaft securing portion 85 defines a length 271 which extends between end plate 124 and security plate 160. The remaining length 272 is a length that extends between the security plate 160 and the second end 123b of the main body 65. The overall length 270 of the main body 65 is the sum of length 271 and length 272.

The remaining length 272 is equal to or greater than the length 271 of the crankshaft securing portion 85. That is, the length 271 of the crankshaft securing portion 85 is equal to or less than the remaining length 272. Otherwise the remaining length 272 is less than the length 271 of the crankshaft securing portion 85. That is, the length 271 of the crankshaft securing portion 85 is greater than the remaining length 272.

It is to be understood that the present invention is not limited to the embodiments described above, but encompasses any and all embodiments within the scope of the following claims.

What is claimed:

1. A lock for securing landing gear assemblies, comprising:
   a main body with a post located in a crankshaft securing portion of the main body, the post extending outward from an interior surface of the main body, the main body having three sidewalls,
   an end plate having a cut-out therein and located at a first end of the crankshaft securing portion, a security plate defines a second end of the crankshaft securing portion, wherein the crankshaft securing portion includes opposite facing lips each of which extend into the crankshaft securing portion, the plurality of crankshaft guides include upper guide surfaces, wherein the opposite facing lips and upper guide surfaces provide first and second slots, wherein the opposite facing lips are disposed on two of the three sidewalls,
   a plurality of crankshaft guides located at least part way between the end plate and the post;
   a detachable elongated sidewall locking plate that secures at least a portion of the crankshaft securing portion of the main body, and is slidably engagable with the first and second slots; and
   a lock mechanism operably communicable with the detachable elongated sidewall locking plate.

2. The lock for securing landing gear assemblies according to claim 1, wherein the crankshaft securing portion includes opposite facing lips each of which extend into the crankshaft securing portion, the plurality of crankshaft guides, wherein the opposite facing lips and the plurality of crankshaft guides provide a slot to accommodate the detachable locking plate.

3. The lock for securing landing gear assemblies according to claim 1, wherein the security plate is located at a position between the post and a second end of the main body.

4. The lock for securing landing gear assemblies according to claim 1, wherein the lock mechanism comprises a spring-loaded lock mechanism having a tongue, wherein the tongue communicates with the detachable locking plate via a hole in a first sidewall of the main body.

5. The lock for securing landing gear assemblies according to claim 4, wherein said spring-loaded lock mechanism comprises a barrel shaped spring lock.

6. The lock for securing landing gear assemblies according to claim 1, wherein said lock mechanism comprises a combination lock.

7. The lock according to claim 1, wherein said lock mechanism comprises a key operated lock.

8. The lock according to claim 1, wherein the main body defines first and second opposite ends, wherein the crankshaft securing portion has a length that extends between the end plate and the security plate, wherein a remaining length is the length between the security plate and the second end of the main body, wherein the remaining length is equal to or greater than the length of the crankshaft securing portion.

9. The lock according to claim 1, wherein the main body defines first and second opposite ends, wherein the crankshaft securing portion has a length that extends between the end plate and the security plate, wherein a remaining length is the length between the security plate and the second end of the main body, wherein the remaining length is less than the length of the crankshaft securing portion.

10. A lock, the lock comprising:
    a main body having a post located in a crankshaft securing portion of the main body, the main body having three sidewalls, the crankshaft securing portion is of sufficient size to accommodate a pivotal portion of a crankshaft and a portion of a crankshaft, wherein the post is dimensioned to be insertable between a pair of legs of the pivotal portion, a plurality of crankshaft guides located at least part way between an end plate and the post; wherein the crankshaft securing portion includes opposite facing lips each of which extend into the crankshaft securing portion, the plurality of crankshaft guides include upper guide surfaces, wherein the opposite facing lips and upper guide surfaces provide first and second slots, wherein the opposite facing lips are disposed on two of the three sidewalls, a detachable elongated sidewall locking plate that fits over at least a portion of the crankshaft securing portion of the main body, and is slidably engagable with the first and second slots; and a lock mechanism operably communicatable with the detachable elongated sidewall locking plate.

11. The lock of claim 10, wherein the main body is made up of a first sidewall, a second sidewall and a middle sidewall, wherein the middle sidewall defines an interior surface, the post extends from the interior surface of the middle sidewall, first and second opposite facing crankshaft guide plates extend outward at a perpendicular angle from the interior surface of the middle sidewall.

12. The lock according to claim 11 further comprising an end plate with a cut-out therein, and a security plate, wherein the crankshaft securing portion extends between the end plate and the security plate.

13. The lock according to claim 10, wherein the crankshaft securing portion includes opposite facing lips each of which extend into the crankshaft securing portion, the plurality of crankshaft guides, wherein the opposite facing lips and the plurality of crankshaft guides provide a slot to accommodate the detachable locking plate to cover the crankshaft securing portion of the main body.

14. The lock according to claim 10, wherein the crankshaft securing portion includes opposite facing lips each of which extend into the crankshaft securing portion, the plurality of crankshaft guides include upper guide surfaces, wherein the opposite facing lips and upper guide surfaces provide a slot to accommodate the detachable locking plate to cover the crankshaft securing portion of the main body.

15. A lock for securing landing gear assemblies, comprising:

a main body with a post located in a crankshaft securing portion of the main body, the main body having three sidewalls, the post extending outward from an interior surface of the main body, an end plate having a cut-out therein and located at a first end of the crankshaft securing portion, a plurality of crankshaft guides located at least part way between the end plate and the post, wherein the crankshaft securing portion includes opposite facing lips each of which extend into the crankshaft securing portion, the plurality of crankshaft guides, wherein the opposite facing lips and the plurality of crankshaft guides provide first and second slots to accommodate a detachable locking plate, wherein a tongue-hole is located in a first sidewall of the main body;

a detachable elongated sidewall locking plate that secures at least a portion of the crankshaft securing portion of the main body, wherein a tab hole extends through a locking tab of the detachable elongated sidewall locking plate, wherein the tongue-hole is positioned such that when the detachable elongated sidewall locking plate is placed in the first and second slots the tab-hole aligns with the tongue-hole; and a lock mechanism operably communicatable with the detachable elongated sidewall locking plate, wherein when the tab-hole is aligned with the tongue-hole a tongue of the lock mechanism is free to pass into the tab-hole whereupon the detachable locking plate is secured over the crankshaft securing portion of the main body.

* * * * *